United States Patent
Smatloch

(10) Patent No.: US 10,994,790 B2
(45) Date of Patent: May 4, 2021

(54) TUBULAR COMPONENT WITH AN EXTRUDED PROFILE

(71) Applicant: Benteler Automobiltechnik GmbH, Paderborn (DE)

(72) Inventor: Christian Smatloch, Paderborn (DE)

(73) Assignee: Benteler Automobiltechnik GmbH, Paderborn (DE)

(*) Notice: Subject to any disclaimer, the term of this patent is extended or adjusted under 35 U.S.C. 154(b) by 46 days.

(21) Appl. No.: 15/957,196

(22) Filed: Apr. 19, 2018

(65) Prior Publication Data

US 2018/0304938 A1    Oct. 25, 2018

(30) Foreign Application Priority Data

Apr. 20, 2017   (DE) .................. 10 2017 108 460.6

(51) Int. Cl.

| | | |
|---|---|---|
| *B62D 29/00* | (2006.01) | |
| *B23P 23/04* | (2006.01) | |
| *B21C 37/06* | (2006.01) | |
| *B21D 39/02* | (2006.01) | |
| *B21C 37/08* | (2006.01) | |
| *B62D 21/02* | (2006.01) | |
| *B21D 5/01* | (2006.01) | |
| *C22F 1/053* | (2006.01) | |
| *C22F 1/05* | (2006.01) | |

(52) U.S. Cl.
CPC .......... *B62D 29/008* (2013.01); *B21C 37/065* (2013.01); *B21C 37/0803* (2013.01); *B21D 5/015* (2013.01); *B21D 39/02* (2013.01); *B23P 23/04* (2013.01); *B62D 21/02* (2013.01); *C22F 1/05* (2013.01); *C22F 1/053* (2013.01)

(58) Field of Classification Search
CPC ....... B62D 29/008; B62D 21/02; B23P 23/04; B21C 37/0803; B21C 37/065; B21D 39/02; B21D 5/015; C22F 1/053; C22F 1/05

See application file for complete search history.

(56) References Cited

U.S. PATENT DOCUMENTS

| | | | |
|---|---|---|---|
| 9,421,594 B2* | 8/2016 | Ueno | ..................... B21D 5/015 |
| 2015/0224842 A1* | 8/2015 | Matsumoto | .............. B60G 9/04 |
| | | | 280/124.125 |

FOREIGN PATENT DOCUMENTS

| | | | | |
|---|---|---|---|---|
| DE | 43 33 500 A1 | 4/1995 | | |
| DE | 10 2004 025 857 A1 | 12/2005 | | |
| DE | 102004025857 A1 * | 12/2005 | ........... | B62D 23/005 |
| JP | 2014-159038 A | 9/2014 | | |
| WO | WO-2013111308 A1 * | 8/2013 | ............. | B21D 5/015 |

OTHER PUBLICATIONS

Computer translation FOr DE102004025857A1 from EPO website (Year: 2005).*

* cited by examiner

*Primary Examiner* — D Glenn Dayoan
*Assistant Examiner* — Melissa Ann Bonifazi
(74) *Attorney, Agent, or Firm* — Holland & Hart LLP

(57) ABSTRACT

The disclosure relates to a tubular component for a chassis of a vehicle, wherein the tubular component may include an extruded profile made of an aluminum alloy. The extruded profile may include a rounded extruded profile base and profile walls extending from the rounded extruded profile base and facing one another, wherein the profile walls are curved towards one another to form the tubular component.

19 Claims, 5 Drawing Sheets

TUBULAR COMPONENT WITH AN EXTRUDED PROFILE

CROSS-REFERENCE TO RELATED APPLICATIONS

This application claims priority to German patent application No. 10 2017 108 460.6, entitled "ROHRFÖRMIGES BAUTEIL MIT EINEM STRANGPRESSPROFIL", and filed on Apr. 20, 2017 by the Applicant of this application. The entire disclosure of the German application is incorporated herein by reference for all purposes.

BACKGROUND

The present disclosure relates to a tubular component for a chassis of a vehicle with an extruded profile, in particular with an extruded profile made of an aluminum alloy.

For stabilizing wheel suspensions in a chassis of a vehicle, longitudinal supports and transverse supports are used in order to provide an effective absorption of occurring forces.

SUMMARY

The aim of the present disclosure is to produce an additional efficient chassis of a vehicle.

This aim is achieved by the features of the independent claims. Advantageous examples are the subject matter of the dependent claims, the description and the appended figures.

The present disclosure is based on the finding that the above aim can be achieved by a tubular component for a chassis of a vehicle, wherein the tubular component comprises an extruded profile made of an aluminum alloy.

In addition to allowing the low weight of the tubular component, a tubular component formed from an aluminum alloy also allows a good dimensional stability, a low susceptibility to corrosion and stress-appropriate design potential.

According to a first aspect, the disclosure relates to a tubular component for a chassis of a vehicle, with an extruded profile made of an aluminum alloy, wherein the extruded profile has a rounded extruded profile base as well as profile walls extending from the rounded extruded profile base and facing one another, wherein the profile walls are curved towards one another in order to form the tubular component.

Thereby, the advantage is achieved that an extruded profile allows a production of tubular components with complex geometries out of materials which are difficult to deform and, in addition, it provides a high degree of deformability and low tool costs.

In vehicles, the tubular component stabilizes a chassis in order to effectively absorb forces occurring during the driving of the vehicle, and, in particular, it can be built into longitudinal supports, transverse supports or control arms of a chassis.

An extruded profile formed from an aluminum alloy has a low dead weight, a high resistance to corrosion and advantageous mechanical properties. Particularly advantageously, the extruded profile formed from the aluminum alloy can be shaped to form the tubular component in a forming tool. Here, a rounded extruded profile base with profile walls extending from the extruded profile base and facing one another are formed. The facing profile walls are curved towards one another in order to form the tubular component.

In the production of the tubular component from an extruded profile consisting of the aluminum alloy, extruded profiles having different wall thicknesses and different shapes can be used in order to produce tubular components of different designs. In addition, a high degree of material utilization and a simplified production method can be achieved.

In an example, the aluminum alloy comprises a hardenable aluminum alloy, wherein, in particular, the extruded profile can be deformed at least in sections before a hardening of the hardenable aluminum alloy.

Thereby, the advantage is achieved that a hardenable aluminum alloy, in contrast to a naturally hard aluminum alloy, can be deformed at least in sections before the hardening. Thereby, the extruded profile can be brought to the desired shape before the hardening in order to provide a tubular component having the desired geometry. The hardening of the hardenable aluminum alloy can comprise, in particular, a heat treatment of the hardenable aluminum alloy in order to thereby increase the strength of the aluminum alloy. A hardening of a hardenable aluminum alloy can comprise, for example, the following steps: heating or solution annealing of the hardenable aluminum alloy in order to dissolve the elements of the hardenable aluminum alloy which are necessary for the hardening, subsequently rapid cooling or quenching of the hardenable aluminum alloy in order to reduce diffusion of components of the hardenable aluminum alloy, and subsequently slight heating or aging of the hardenable aluminum alloy in order to precipitate components of the hardenable aluminum alloy and thus increase the hardness of the hardenable aluminum alloy.

In an example, in addition to aluminum, the hardenable aluminum alloy also comprises in manganese, magnesium, iron, chromium, copper, titanium, silicon, nickel, zinc and/or beryllium, and the aluminum alloy comprises, in particular, an aluminum-magnesium-silicon alloy and/or an aluminum-zinc alloy.

Thereby, the advantage is achieved that the use of the mentioned elements enables the formation of particularly advantageously hardenable aluminum alloys. In particular, an aluminum-magnesium-silicon alloy of aluminum series 6000 according to the DIN standard DIN EN 573-3 and/or an aluminum-zinc alloy according of aluminum group 7000 according to the DIN standard DIN EN 573-3 can be used.

In an example, a longitudinal axis of the tubular component extends from a first end of the tubular component to a second end of the tubular component facing away from the first end, and a transverse axis of the tubular component extends transversely to the longitudinal axis, wherein the tubular component is curved around the longitudinal axis and/or the transverse axis.

Thereby, the advantage is achieved that the extruded profile formed from an aluminum alloy can be formed particularly advantageously and can thus be brought to the desired form. Tubular components inserted in a chassis of a vehicle often must have one or more curves in order to ensure an effective absorption of forces within the chassis. Here in particular, a single or multiple curving of the tubular component around the longitudinal axis and/or around the transverse axis is advantageous.

In an example, the tubular component has a first end and a second end which faces away from the first end, wherein the tubular component has a first diameter on the first end, wherein the tubular component has a second diameter on the second end, wherein the second diameter is smaller than the first diameter, and wherein the tubular component is formed, in particular, as a funnel-shaped tubular component.

Thereby, the advantage is achieved that a tubular component which tapers from the first end to the second end, in particular, a funnel-shaped tubular component, ensures a particularly advantageous design of the tubular component.

In an example, the tubular component has a first end and a second end facing away from the first end, wherein the first end is connected to the second end via a connecting section, wherein the connecting section has a connection diameter, wherein the tubular component has a first diameter on the first end, wherein the tubular component has a second diameter on the second end, wherein the connection diameter is greater than the first diameter, and wherein the connection diameter is greater than the second diameter.

Thereby, the advantage is achieved that the connecting section ensures a uniform radial broadening in the middle of the tubular component, so that a particularly advantageous design of the tubular component is ensured. Here, in particular, the wall thickness of the extruded profile in the connecting section is different from, in particular greater than, the wall thickness of the extruded profile on the first and/or second end of the tubular component.

In an example, the extruded profile has at least one bulge, wherein the at least one bulge is arranged, in particular, on the extruded profile base and/or on at least one of the profile walls.

Thereby, the advantage is achieved that the at least one bulge of the extruded profile ensures a particularly advantageous design of the tubular component and enables a load-optimized adaptation to a respective given installation space.

In an example, on an inner side and/or outer side of the extruded profile, at least one web, bead and/or thickening is/are arranged, wherein, in particular, the web, bead and/or thickening extend(s) at least in sections along a longitudinal axis of the tubular component.

Thereby, the advantage is achieved that the at least one web, bead and/or thickening ensures a particularly advantageous stabilization of the extruded profile.

In an example, the profile walls comprise a first profile wall with a first profile margin and a second profile wall with a second profile margin, wherein the first profile wall and the second profile wall face one another and are curved towards one another, and wherein the first profile margin is connected in a firmly bonded manner to the second profile margin, in particular welded, in order to form the tubular component, in particular the closed tubular component.

Thereby, the advantage is achieved that, by the firmly bonded connection, in particular by means of a weld seam, between the first and second profile margins, a particularly advantageous design of the tubular component is ensured.

In an example, the profile walls comprise a first profile wall and a second profile wall which face one another and are curved towards one another, wherein the first profile wall has a recess extending along a longitudinal axis of the tubular component, into which recess a protrusion of the second profile wall, which extends along the longitudinal axis of the tubular component, is introduced in order to form the tubular component.

Thereby, the advantage is achieved that, by means of the introduction of the protrusion into the recess, the two profile walls can be effectively closed in order to form the tubular component. On the area between the recess and the protrusion, the first profile wall can be connected in a firmly bonded manner to the second profile wall, in particular welded to it, in order to provide the tubular component.

Here, the introduction of the protrusion into the recess can provide an effective pool support, by means of which the welding material is prevented from reaching the interior of the tubular component in an uncontrolled manner.

In an example, the extruded profile is formed as a tube wall which delimits an interior space of the tubular component, wherein the tube wall is arranged around the interior space of the tubular component, in particular completely circumferentially around it.

Thereby, the advantage is achieved that the extruded profile can be shaped advantageously so as to provide a tube wall which can effectively enclose the interior space of the tubular component, in particular enclose it completely circumferentially.

In an example, the tubular component can be built into a chassis of a vehicle, wherein the tubular component comprises, in particular, a control arm, an axle, an axle support, a longitudinal support, a transverse support and/or a stabilizer.

Thereby, the advantage is achieved that the tubular component provides a particularly advantageous chassis.

Further, according to a second aspect, the disclosure relates to a chassis of a vehicle, comprising a tubular component according to the first aspect.

In this manner, it can be ensured that the extruded profile shaped from an aluminum alloy ensures an advantageous tubular component which can be installed particularly effectively in a chassis of a vehicle.

Further, according to a third aspect, the disclosure relates to a method for producing a tubular component for a chassis of a vehicle, comprising the following method steps, insertion of a U-shaped extruded profile made of an aluminum alloy in a forming tool, wherein the U-shaped extruded profile has a first profile margin and a second profile margin which face one another, and bringing together of the first profile margin and the second profile margin by curving in the forming tool in order to obtain the tubular component.

In this manner, it can be ensured that the tubular component can be produced particularly advantageously from the U-shaped extruded profile shaped from an aluminum alloy. The aluminum alloy here provides particularly advantageous reshaping properties which make it possible to form the tubular component from the U-shaped extruded profile by curving in an appropriate forming tool, in particular a U- or O-shaped forming tool.

In an example, after the insertion of the U-shaped extruded profile into the forming tool, the method further comprises the following method steps, bending of the U-shaped extruded profile in the forming tool transversely to a longitudinal axis of the extruded profile in order to obtain an arc-shaped extruded profile, and bringing together of the first profile margin and the second profile margin of the arc-shaped extruded profile by curving in the forming tool in order to obtain a curved tubular component.

Thereby, the advantage is achieved that a tubular component curved around a transverse axis extending transversely to the longitudinal axis can be obtained. By the bending of the U-shaped extruded profile in the forming tool, an arc-shaped extruded profile is generated, which has a curved shape, in particular, a banana shape, along the longitudinal axis of the extruded profile.

In an example, the bending and/or curving in the forming tool is carried out by means of several curving steps, wherein the bending process and/or curving process is interrupted after each curving step.

Thereby, the advantage is achieved that, due to the interruption of the bending process or curving process, after each curving step, a particularly advantageous curving of the U-shaped extruded profile is ensured, since, during the interruption, a calibration or new optimization of the subsequent curving step is carried out. Therefore, extruded profiles made of aluminum alloys which are difficult to shape can be curved to the desired shape.

In an example, before the insertion of the U-shaped extruded profile into the forming tool, the method comprises the following method step, two-sided cutting of a closed extruded profile made of the aluminum alloy with a cutting tool in order to obtain the U-shaped extruded profile with the first profile margin and the second profile margin which face one another.

Thereby, the advantage is achieved that, by the two-sided cutting of the closed extruded profile, in particular by the cutting of a first profile wall of the closed extruded profile and by the cutting of a second profile wall of the closed extruded profile, wherein the second profile wall faces the first profile wall, and wherein the first profile wall and the second profile wall are curved towards one another, an advantageously shaped U-shaped extruded profile can be obtained. Here, by the selection of the shape of the cutting edges, the course of the profile margins of the profile walls can be controlled, and the shape of the tubular component can be adapted.

In an example, the cutting tool is designed as a laser cutting tool for cutting the closed extruded profile on both sides during a laser cutting process.

Thereby, the advantage is achieved that a laser cutting process with a laser cutting tool allows a particularly effective two-sided cutting of the closed extruded profile.

In an example, the first and second profile margins generated during the two-sided cutting of the closed extruded profile extend from a first end of the extruded profile to a second end of the extruded profile facing the first end, in each case diagonally with respect to a longitudinal axis of the U-shaped extruded profile, wherein the tubular component obtained after the bringing together of the first profile margin and the second profile margin tapers from the first end of the tubular component to the second end of the tubular component.

Thereby, the advantage is achieved that, due to the cutting of a course of the first and second profile margins which is diagonal to the longitudinal axis, the diameter of the tubular component along the longitudinal axis decreases from the first end to the second end. Due to the diagonal course of the first and second profile margins, the profile margin runs along the longitudinal axis in such a manner that the distance extending circumferentially on the extruded profile between the two profile margins changes along the longitudinal axis, in particular decreases. Thus, the profile margins do not run parallel to the longitudinal axis of the extruded profile.

In an example, the first and second profile margins generated during the two-sided cutting of the closed extruded profile extend from a first end of the extruded profile to a second end of the extruded profile facing the first end, in each case in a wavy pattern with respect to a longitudinal axis of the U-shaped extruded profile, wherein the tubular component obtained during the bringing together of the first profile margin and the second profile margin has a bulge in the extruded profile of the tubular component.

Thereby, the advantage is achieved that a tubular component of different diameters is obtained, whereby a bulge is formed. The wavy course of the profile margins extends from the first end of the extruded profile to the facing second end of the extruded profile along the longitudinal axis of the extruded profile. Thereby, the distance extending circumferentially on the extruded profile between the two profile margins also changes in a wavy pattern along the longitudinal axis.

In an example, the bringing together of the first profile margin and the second profile margin further comprises the connecting in a firmly bonded manner, in particular welding, of the first profile margin to the second profile margin in order to obtain the tubular component.

Thereby, the advantage is achieved that the connecting in a firmly bonded manner, in particular welding, ensures that the tubular component is advantageously formed.

In an example, the extruded profile is formed from a hardenable aluminum alloy, in particular from an aluminum-magnesium-silicon alloy and/or aluminum-zinc alloy, wherein, after the bringing together of the first profile margin and the second profile margin in order to obtain the tubular component, the method further comprises the following method step, heating of the tubular component in order to harden the tubular component.

Thereby, the advantage is achieved that, due to the hardening of the tubular component after the two profile margins have been brought together, the hardness of the tubular component and thus the mechanical stability of the tubular component can advantageously be increased.

According to a fourth aspect, the disclosure further relates to a tubular component which can be produced by a method according to the third aspect.

Thereby, the advantage is achieved that, by method according to the third aspect of the disclosure, a particularly advantageous tubular component can be produced.

BRIEF DESCRIPTION OF THE DRAWINGS

Examples of the present disclosure are explained in reference to the appended figures.

DETAILED DESCRIPTION

Figure 1:
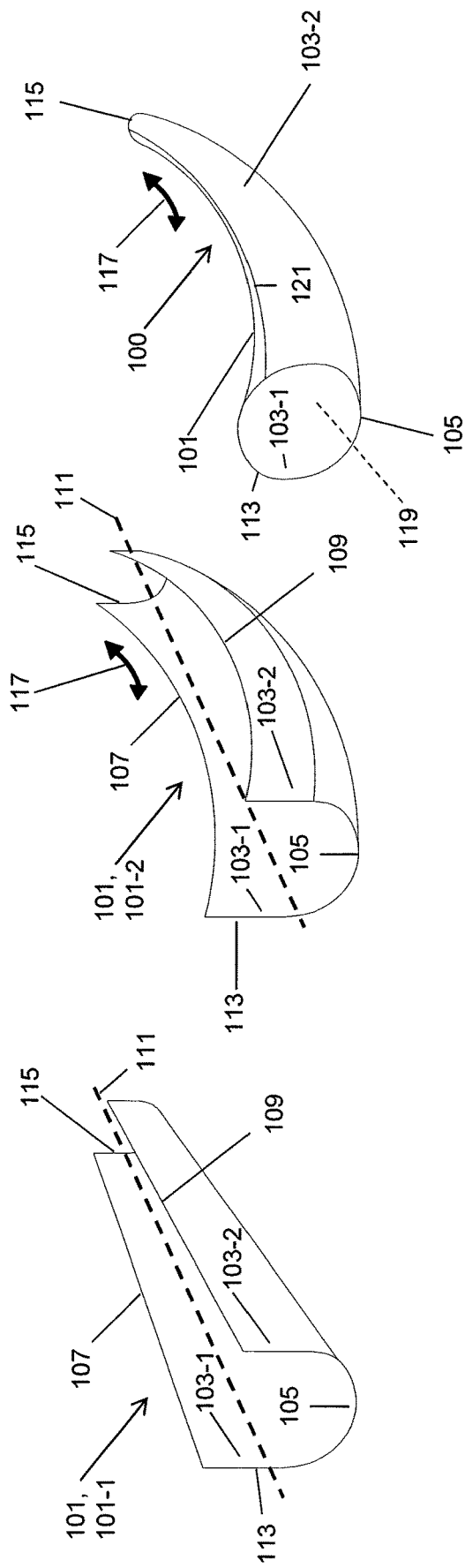
FIGS. 1A, 1B, 1C show different extruded profiles for a chassis of a vehicle according to a first example.

FIGS. 1A, 1B and 1C show different extruded profiles for a chassis of a vehicle according to a first example. The chassis of a vehicle is used for connecting a frame of the vehicle via the wheels of the vehicle to the road. The chassis here comprises in particular the wheel suspension for the suspension of the wheels of the vehicle, the steering for controlling a wheel angle of the wheels, the brakes for braking the wheels and/or the axle of the vehicle.

One or more of the tubular components 100 can be installed in the chassis of the vehicle and can be formed in particular as longitudinal support, transverse support, control arm, axle support, axle or stabilizer.

Conventional tubular components 100 are produced by extrusion processes, whereby it can be ensured that the tubular components 100 have a good dimensional stability, a low susceptibility to corrosion, and a stress-appropriate design potential. Here, in the production, a semi-finished product as a precursor in a reshaping or deep drawing tool under a mechanical press is formed in one or more steps into a U-shaped intermediate geometry, and subsequently the free longitudinal edges of the U-shaped intermediate geometry are deformed together in a last step, until the longitudinal edges are together and connected to one another, so that a closed cross section is generated and the tubular component 100 is obtained.

Conventional tubular components 100 consist of steel materials which have a high weight and are therefore disadvantageous for use in a vehicle, since they increase the total weight and thus the fuel consumption of the vehicle.

The tubular component 100 according to the present disclosure is shaped from an aluminum alloy, in particular from a hardenable aluminum alloy. Hardenable aluminum alloys have an advantageous mechanical stability and a low susceptibility to corrosion. Extruded profiles made of hardenable aluminum alloys according to the present disclosure can here be brought to the desired shape in a forming tool by an interaction of curving and calibration. Subsequently, the profile can be closed and the tubular component 100 can be obtained.

A hardenable aluminum alloy according to the present disclosure is an aluminum alloy which can be subjected to a heat treatment in order to harden the aluminum alloy and thereby increase the strength of the aluminum alloy. A hardening of a hardenable aluminum alloy can comprise, for example, the following steps: heating or solution annealing of the hardenable aluminum alloy in order to dissolve the elements of the hardenable aluminum alloy which are necessary for the hardening, subsequently rapid cooling or quenching of the hardenable aluminum alloy in order to reduce diffusion of components of the hardenable aluminum alloy, and subsequently slight heating or aging of the hardenable aluminum alloy in order to precipitate components of the hardenable aluminum alloy and thereby increase the hardness of the hardenable aluminum alloy.

In addition to the main component aluminum, hardenable aluminum alloys can also comprise other elements such as, for example, manganese, magnesium, iron, chromium, copper, titanium, silicon, nickel, zinc and/or beryllium. In particular, a hardenable aluminum alloy comprises an aluminum-magnesium-silicon alloy of series 6000 according to the DIN standard DIN 573-3 and/or an aluminum-zinc alloy of the series 7000 according to the DIN standard DIN EN 573-3.

Thus, hardenable aluminum alloys have an advantageous mechanical stability and an advantageous resistance to corrosion and they can be shaped effectively into a tubular component 100.

In the production of a tubular component 100 for a chassis of a vehicle, according to FIG. 1A, an extruded profile 101 made of an aluminum alloy, in particular of a hardenable aluminum alloy, is provided.

The extruded profile 101 is formed as a U-shaped extruded profile 101-1 which is open on one side. The U-shaped extruded profile 101-1 has a first profile wall 103-1 and a second profile wall 103-2 facing the first profile wall 103-1. The U-shaped extruded profile 101-1 further has a rounded extruded profile base 105 from which the profile walls 103-1, 103-2 extend.

The first profile wall 103-1 has a first profile margin 107 and the second profile wall 103-2 has a second profile margin 109. Here, the first profile margin 107 and the second profile margin 109 extend along a longitudinal axis 111 of the U-shaped extruded profile 101-1. The longitudinal axis 111 extends from a first end 113 to a second end 115 of the U-shaped extruded profile 101-1 facing the first end 113.

The U-shaped extruded profile 101-1 which is open on one side, represented in FIG. 1A, is subsequently inserted in a forming tool and curved transversely to the longitudinal axis 111 of the U-shaped extruded profile 101-1 in order to obtain an arc-shaped extruded profile 101-2 according to FIG. 1B. As a result, the arc-shaped extruded profile 101-2 according to FIG. 1B has a curvature 117, whereby the first and the second profile margins 107, 109 no longer extend parallel to the longitudinal axis 111.

The arc-shaped extruded profile 101-2 represented in FIG. 1B is subsequently curved again in the forming tool. Here, the curving of the arc-shaped extruded profile 101-2 occurs around the longitudinal axis 111. The first profile margin 107 of the first profile wall 103-1 and the second profile margin 109 of the second profile wall 103-2 are here curved towards one another and subsequently brought together in order to obtain the curved tubular component 100 represented in FIG. 1C. Here, optionally, the bending can be dispensed with so as not to obtain the arc-shaped extruded profile 101-2 according to FIG. 1B, wherein, in this case, the tubular component 100 represented in FIG. 1C is not curved but formed so as to be straight.

The bending of the U-shaped extruded profile 101-1 and the curving of the arc-shaped extruded profile 101-2 here occur in particular in each case by several curving steps, wherein the bending process and/or the curving process is interrupted after each curving step. Thereby, the curving or bending can be optimized stepwise, or the process can be readjusted before an additional subsequent curving step.

In the bringing together of the profile margins 107, 109, the profile margins 107, 109 are connected to one another in particular in a firmly bonded manner, for example, by a weld seam. The connecting here occurs in the context of a firmly bonded connection, in particular in the context of a welding process. The tubular component 100 represented in FIG. 1C has a curvature 117 and comprises an extruded profile 101 formed as a tube wall, which delimits an interior space 119 of the tubular component 100. Between the first and the second profile margins 107, 109, the tubular component 100 represented in FIG. 1B has a connecting site 121. In a welding process, the connecting site 121 is formed as a weld seam.

Figure 2:
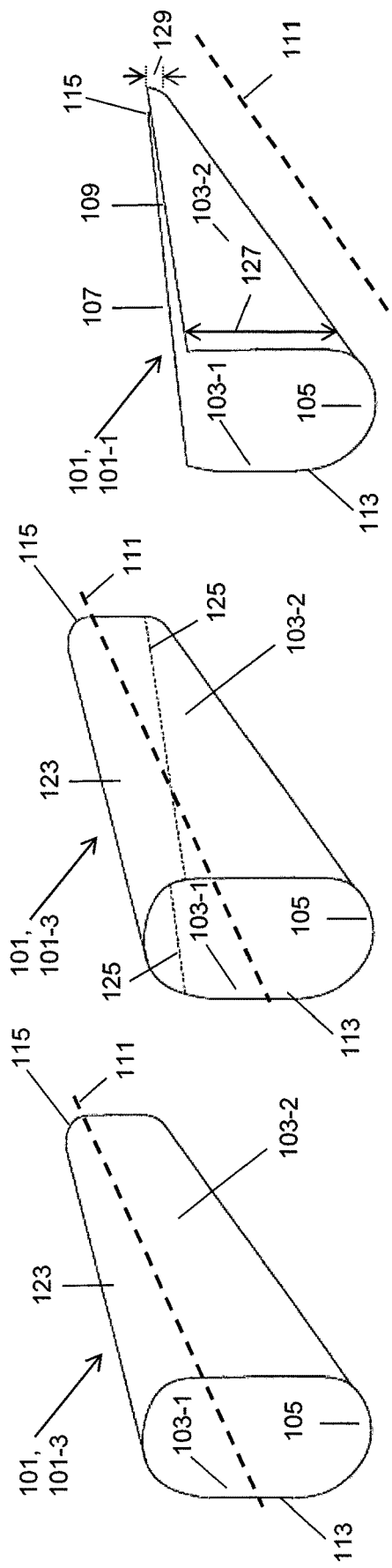
FIGS. 2A, 2B, 2C show different extruded profiles for a chassis of a vehicle according to a second example.

FIGS. 2A, 2B, 2C show different extruded profiles for a chassis of a vehicle according to a second example.

In the production of tubular components 100 for a chassis of a vehicle, according to FIG. 2A, an extruded profile 101 made of an aluminum alloy, in particular a hardenable aluminum alloy according to the first example, is provided. The extruded profile 101 is formed as a closed extruded profile 101-3.

The closed extruded profile 101-3 has a first profile wall 103-1 and a second profile wall 103-2 facing the first profile wall 103-1. The first profile wall 103-1 and the second profile wall 103-2 are here connected to one another by means of an extruded profile base 105. On the side facing away from the extruded profile base 105, the profile walls 103-1, 103-2 are connected to one another by means of an extruded profile cover 123.

A longitudinal axis 111 of the closed extruded profile 101-3 extends from a first end 113 to a second end 115 of the closed extruded profile 101-3.

The first and second profile walls 103-1, 103-2 of the closed extruded profile 101-3 are subsequently cut on both sides by a cutting tool along the longitudinal axis 111 of the closed extruded profile 101-3, wherein the two cutting sites 125 are represented in the closed extruded profile 101-3 represented in FIG. 2B. In particular, the cutting tool can here comprise a laser cutting tool.

Subsequently, the extruded profile cover 123 of the closed extruded profile 101-3 is removed in order to obtain the U-shaped extruded profile 101-1 represented in FIG. 2C. The U-shaped extruded profile 101-1 which is open on one side has a first profile margin 107 on the first profile wall 103-1 and has a second profile margin 109 on the second profile wall 103-2.

The first profile margin 107 generated during the cutting of the first profile wall 103-1 extends along the longitudinal axis 111 from a first end 113 of the U-shaped extruded profile 101-1 diagonally with respect to a facing second end 115 of the U-shaped extruded profile 101-1. The second profile margin 109 generated during the cutting of the second profile wall 103-2 extends along the longitudinal axis 111 from the first end 113 of the U-shaped extruded profile 101-1 diagonally with respect to a facing second end 115 of the U-shaped extruded profile 101-1.

Thereby, the first and second profile walls 103-1, 103-2 have a first wall width 127 on the first end 113, which extends transversely to the longitudinal axis 111, and the first and second profile walls 103-1, 103-2 have a second wall width 129 on the second end 115, which extends transversely to the longitudinal axis 111, wherein the first wall width 127 is greater than the second wall width 129.

The tubular component 100 obtained during a subsequent bringing together of the first profile margin 107 and the second profile margin 109 and not represented in FIG. 2C thus tapers from the first end 113 to the second end 115 of the tubular component 100 and is formed, in particular, as a funnel-shaped tubular component 100.

Figure 3:
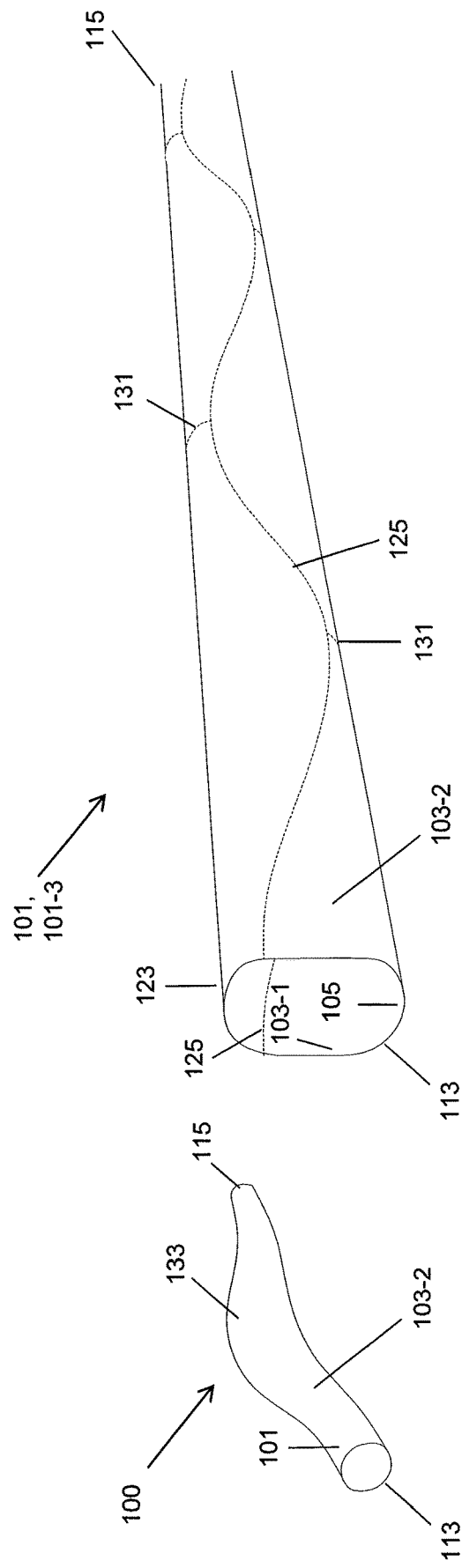
FIGS. 3A, 3B show different extruded profiles for a chassis of a vehicle according to a third example.

FIGS. 3A and 3B show different extruded profiles for a chassis of a vehicle according to a third example.

The extruded profile 101 represented in FIG. 3B is formed as a closed extruded profile 101-3 made of an aluminum alloy, in particular of a hardenable aluminum alloy according to the first example. The closed extruded profile 101-3 has a first profile wall 103-1 and a second profile wall 103-2 facing the first profile wall 103-1, which are connected to one another by means of an extruded profile base 105, and which are connected to one another on a side facing away from the extruded profile base 105 by means of an extruded profile cover 123.

A longitudinal axis 111 of the closed extruded profile 101-3 extends from a first end 113 to a second end 115 of the closed extruded profile 101-3.

The first and second profile walls 103-1, 103-2 of the closed extruded profile 101-3 are cut on both sides by a cutting tool along the longitudinal axis 111 of the closed extruded profile 101-3, wherein the two cutting sites 125 are represented in the closed extruded profile 101-3 represented in FIG. 3B.

The first and second profile margins 107, 109 generated during the two-sided cutting of the first and second profile walls 103-1, 103-2 extend along the longitudinal axis 111 from a first end 113 of the U-shaped extruded profile 101-1, not represented in FIG. 3B, in a wavy pattern with respect to a facing second end 115 of the U-shaped extruded profile 101-1.

Further, with the cutting tool, additional openings 131 extending transversely to the longitudinal axis 111 of the extruded profile 101 can be cut. Subsequently, the areas of the closed extruded profile 101-3 cut by the openings 125, 131 are detached from one another in order to obtain the U-shaped extruded profile 101-1, not represented in FIG. 3B.

If, subsequently, the first profile margin 107 and the second profile margin 109 of the U-shaped extrusion profile 101-1 which is not represented are brought together, the tubular component 100 represented in FIG. 3A is obtained. Due to the wavy course of the profile margins 107, 109, the tubular component 100 represented in FIG. 3A has a bulge 133.

Figure 4:
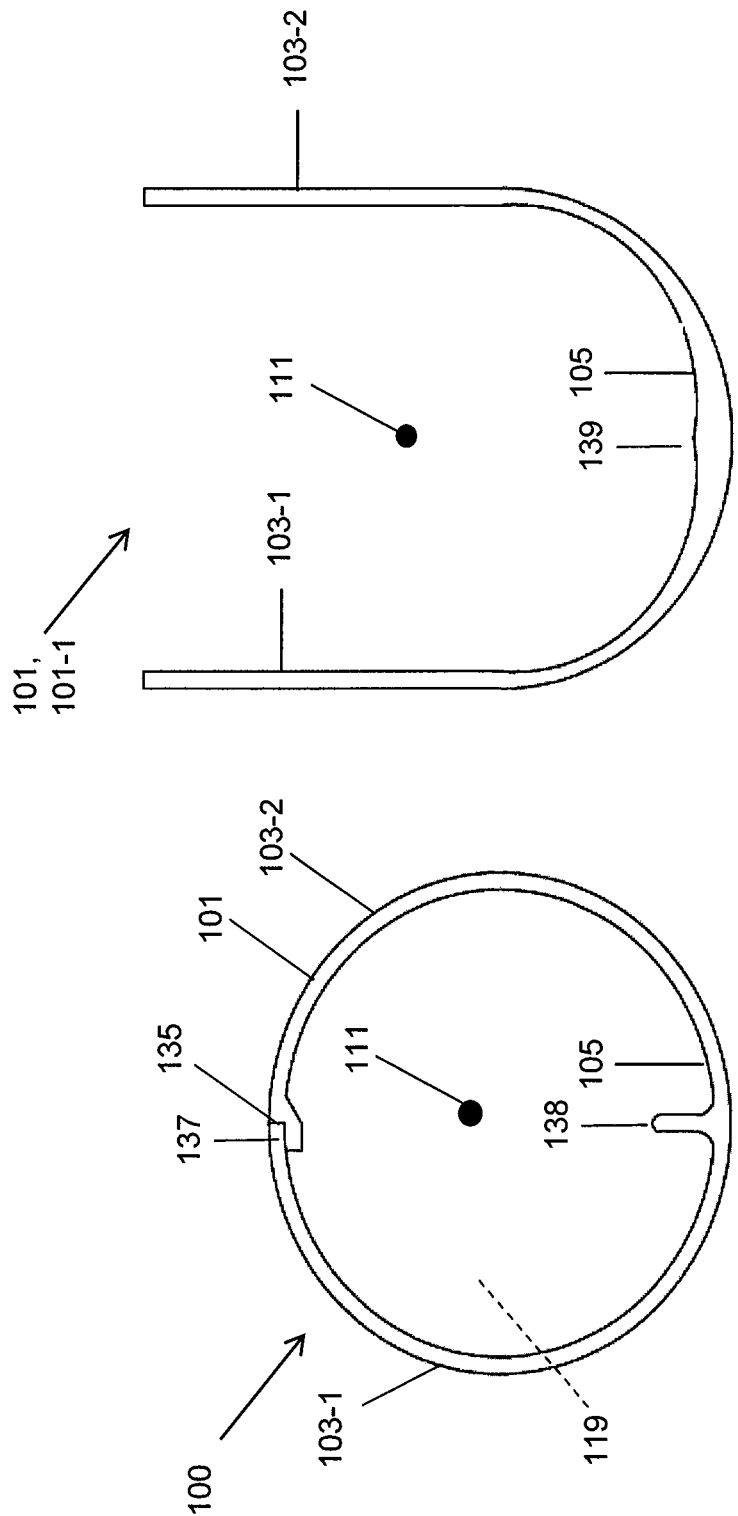
FIGS. 4A, 4B show different extruded profiles for a chassis of a vehicle according to additional examples.

FIGS. 4A and 4B show different extruded profiles for a chassis of a vehicle according to additional examples in cross section.

FIG. 4A shows a tubular component 100 with a first profile wall 103-1 and a second profile wall 103-2 which face one another and are curved towards one another. The first profile wall 103-1 has a recess 135 extending along a longitudinal axis 111 of the tubular component 100, into which a protrusion 137 of the second profile wall 103-2, which extends along the longitudinal axis 111 of the tubular component 100, is introduced in order to form the tubular component 100. Thereby, an effective connection between the first and second profile walls 103-1, 103-2 is provided in order to prevent an uncontrolled penetration of welding material into the interior space 119 of the tubular component 100. On the extruded profile 101, in particular on the extruded profile base 105, a web 138 is formed.

FIG. 4B shows a U-shaped extruded profile 101-1 with a thickening 139 which is arranged on the extruded profile 101, in particular on the rounded extruded profile base 105, and wherein the thickening 139 extends at least in sections along a longitudinal axis 111 of the tubular component 100 in order to effectively stabilize the tubular component 100.

Figure 5:
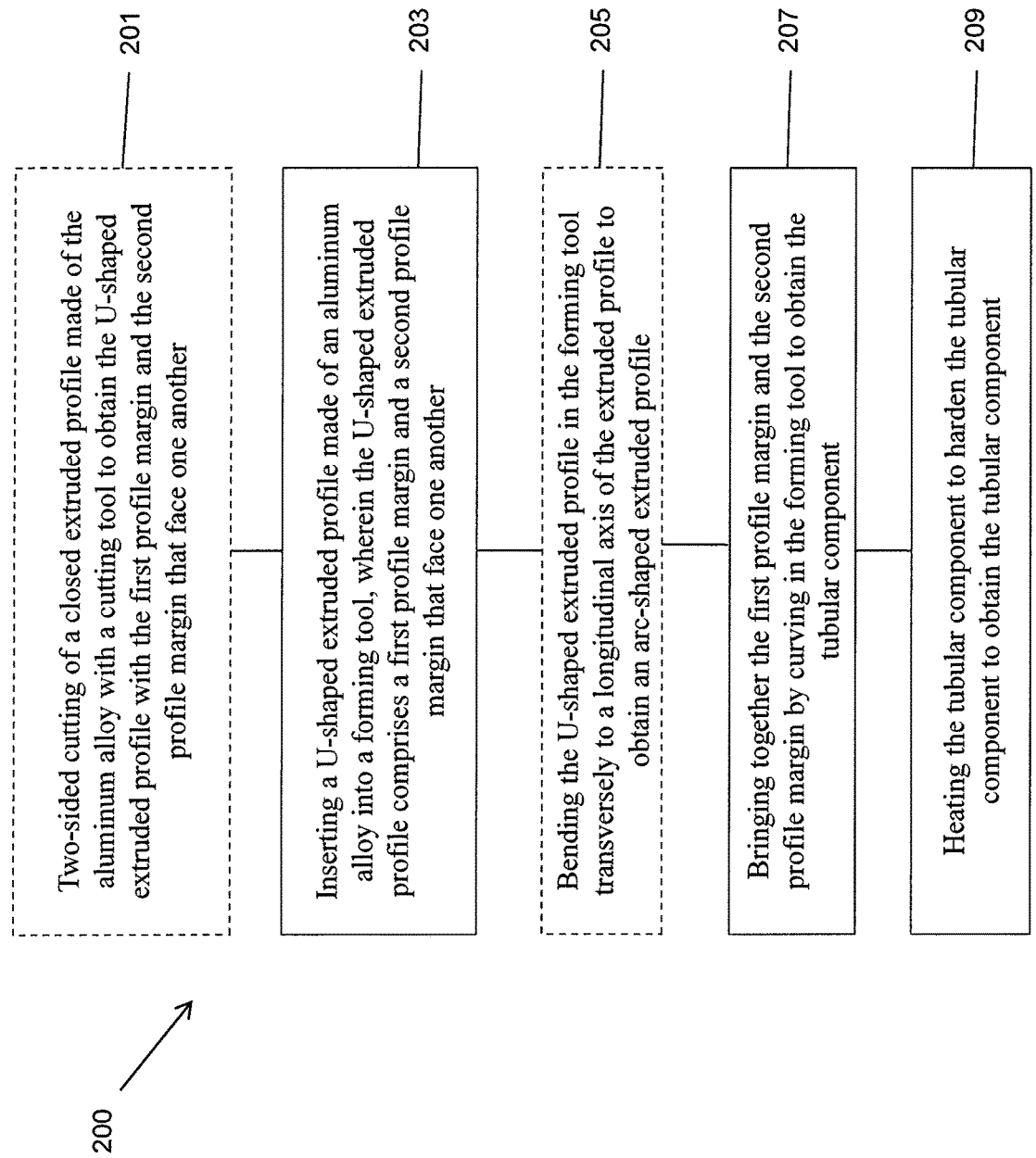
FIG. 5 shows a method for producing a tubular component for a chassis of a vehicle.

FIG. 5 shows a method for producing a tubular component 100 for a chassis of a vehicle.

If no U-shaped extruded profile 101-1 is available, the method 200 comprises, as first optional method step, the two-sided cutting 201 of a closed extruded profile 101-3 made of the aluminum alloy using a cutting tool in order to obtain the U-shaped extruded profile 101-1 with the first profile margin 107 and the second profile margin 109 which face one another.

The method 200 comprises, as second method step, the insertion 203 of the U-shaped extruded profile 101-1 made of the aluminum alloy into a forming tool, wherein the U-shaped extruded profile 101-1 has a first profile margin 107 and a second profile margin 109 which face one another.

If the U-shaped extruded profile 101-1 is to be curved transversely to the longitudinal axis 111 thereof, the method 200 comprises, as a third optional method step, the bending 205 of the U-shaped extruded profile 101-1 in the forming tool transversely to a longitudinal axis 111 of the extruded profile 101-1 in order to obtain an arc-shaped extruded profile 101-2.

The method comprises, as fourth method step, the bringing together 207 of the first profile margin 107 and the second profile margin 109 by curving in the forming tool in order to obtain the tubular component 100, or in order to obtain a curved tubular component 100.

The method comprises, as fifth optional method step, if the aluminum alloy comprises a hardenable aluminum alloy, the heating 209 of the tubular component 100 in order to harden the tubular component 100.

LIST OF REFERENCE NUMBERS

100 Tubular component
101 Extruded profile
101-1 U-shaped extruded profile
101-2 Arc-shaped extruded profile 101-3 Closed extruded profile
103-1 First profile wall
103-2 Second profile wall
105 Rounded extruded profile base
107 First profile margin
109 Second profile margin
111 Longitudinal axis
113 First end
115 Second end
117 Curvature
119 Interior space
121 Connection site
123 Extruded profile cover
125 Cutting site
127 First wall width
129 Second wall width
131 Additional opening
133 Bulge
135 Recess
137 Protrusion
138 Web
139 Thickening
200 Method for producing a tubular component
201 Two-sided cutting of a closed extruded profile
203 Insertion of a U-shaped extruded profile in a forming tool
205 Bending of the U-shaped extruded profile
207 Bringing together of the first and second profile margins
209 Heating of the tubular component

What is claimed is:

1. A tubular component for a chassis of a vehicle, comprising:
an extruded profile made of an aluminum alloy, wherein the extruded profile comprises:
a rounded extruded profile base; and
profile walk extending from the rounded extruded profile base and facing one another, wherein the profile walls are curved towards one another to form the tubular component;
wherein the tubular component is a tubular component of a longitudinal support of the chassis, of a transverse support of the chassis, or of a control arm of the chassis.

2. The tubular component according to claim 1, wherein the aluminum alloy comprises a hardenable aluminum alloy, and wherein the extruded profile is configured to be deformed at least in sections before a hardening of the hardenable aluminum alloy.

3. The tubular component according to claim 2, wherein the hardenable aluminum alloy further comprises one or more of: manganese, magnesium, iron, chromium, copper, titanium, silicon, nickel, zinc and beryllium, and wherein the aluminum alloy comprises an aluminum-magnesium-silicon alloy, an aluminum-zinc alloy, or a combination thereof.

4. The tubular component according to claim 1, wherein a longitudinal axis of the tubular component extends from a first end of the tubular component to a second end of the tubular component facing away from the first end, wherein a transverse axis of the tubular component extends transversely to the longitudinal axis, and wherein the tubular component is curved around the longitudinal axis the transverse axis, or a combination thereof.

5. The tubular component according to claim 1, wherein the tubular component comprises a first end and a second end facing away from the first end, wherein the tubular component comprises a first diameter on the first end, wherein the tubular component further comprises a second diameter on the second end, wherein the second diameter is smaller than the first diameter, and wherein the tubular component is formed as a funnel-shaped tubular component.

6. The tubular component according to claim 1, wherein the tubular component comprises a first end and a second end facing away from the first end, wherein the first end is connected to the second end by a connecting section, wherein the connecting section comprises a connection diameter, wherein the tubular component further comprises a first diameter on the first end, wherein the tubular component comprises a second diameter on the second end, wherein the connection diameter is greater than the first diameter and the second diameter.

7. The tubular component according to claim 1, wherein the extruded profile comprises at least one bulge, and wherein the at least one bulge is disposed on the extruded profile base, on at least one of the profile walls, or a combination thereof.

8. The tubular component according to claim 1, wherein at least one web, bead, thickening, or some combination thereof, is arranged on an inner side, outer side, or a combination thereof, of the extruded profile, and wherein the web, the bead, the thickening, or some combination thereof extends at least in sections along a longitudinal axis of the tubular component.

9. The tubular component according to claim 1, wherein the profile walls comprise a first profile wall with a first profile margin and a second profile wall with a second profile margin, wherein the first profile wall and the second profile wall face one another and are curved towards one another, and wherein first profile margin is welded to the second profile margin to form the tubular component.

10. The tubular component according to claim 1, wherein the profile walls comprise a first profile wall and a second profile wall that face one another and are curved towards one another, wherein the first profile wall comprises a recess extending along a longitudinal axis of the tubular component, and wherein a protrusion of the second profile wall extends along the longitudinal axis of the tubular component, wherein the protrusion of the second profile wall is inserted into the recess to form the tubular component.

11. The tubular component according to claim 1, wherein the extruded profile is formed as a tube wall that delimits an inner space of the tubular component, wherein the tube wall is arranged completely circumferentially around an interior space of the tubular component.

12. A method for producing a tubular component for a chassis of a vehicle, comprising:
inserting a U-shaped extruded profile made of an aluminum alloy into a forming tool, wherein the U-shaped extruded profile comprises a first profile margin and a second profile margin that face one another; and
bringing together the first profile margin and the second profile margin by curving in the forming tool to obtain the tubular component;
wherein the tubular component is a tubular component of a longitudinal support of the chassis, of a transverse support of the chassis, or of a control arm of the chassis.

13. The method according to claim 12, wherein, after the insertion of the U-shaped extruded profile into the forming tool, the method further comprises:
bending the U-shaped extruded profile in the forming tool transversely to a longitudinal axis of the extruded profile to obtain an arc-shaped extruded profile; and bringing together the first profile margin and the second profile margin of the arc-shaped extruded profile by curving in the forming tool to obtain a curved tubular component.

14. The method according to claim 12, wherein the bending, curving, or a combination thereof, in the forming tool is carried out by several curving steps, wherein the bending, curving, or the combination thereof, is interrupted after each curving step.

15. The method according to claim 12, wherein before the insertion of the U-shaped extruded profile into the forming tool, the method further comprises:

two-sided cutting of a closed extruded profile made of the aluminum alloy with a cutting tool to obtain the U-shaped extruded profile with the first profile margin and the second profile margin that face one another.

16. The method according to claim 15, wherein the first and second profile margins, produced during the two-sided cutting of the closed extruded profile, extend from a first end of the extruded profile to a second end of the extruded profile facing the first end, in each case extending diagonally with respect to a longitudinal axis of the U-shaped extruded profile, and wherein the tubular component obtained after the bringing together the first profile margin and the second profile margin tapers from the first end of the tubular component to the second end of the tubular component.

17. The method according to claim 15, wherein the first and second profile margins, produced during the two-sided cutting of the closed extruded profile, extend from a first end of the extruded profile to a second end of the extruded profile facing the first end, in each case extending in a wavy pattern with respect to a longitudinal axis of the U-shaped extruded profile, and wherein the tubular component obtained during the bringing together the first profile margin and the second profile margin comprises a bulge in the extruded profile of the tubular component.

18. The method according to claim 12, wherein the bringing together the first profile margin and the second profile margin further comprises welding the first profile margin to the second profile margin to obtain the tubular component.

19. The method according to claim 12, wherein the extruded profile is formed from a hardenable aluminum alloy, wherein the hardenable aluminum alloy comprises an aluminum-magnesium-silicon alloy, aluminum-zinc alloy, or a combination thereof, and wherein, after the bringing together the first profile margin and the second profile margin, the method further comprises heating the tubular component to harden the tubular component to obtain the tubular component.

* * * * *